US012541728B2

(12) United States Patent
Coles et al.

(10) Patent No.: US 12,541,728 B2
(45) Date of Patent: Feb. 3, 2026

(54) SYSTEMS AND METHODS FOR AN INTERACTIVE CUSTOMER INTERFACE UTILIZING CUSTOMER DEVICE CONTEXT

(71) Applicant: WELLS FARGO BANK, N.A., San Francisco, CA (US)

(72) Inventors: Nathan Coles, San Francisco, CA (US); Darren M. Goetz, San Francisco, CA (US); Uma Meyyappan, San Francisco, CA (US); Dennis Montenegro, San Francisco, CA (US); Steve Perez, San Francisco, CA (US); Debarchana Roy, San Francisco, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 17 days.

(21) Appl. No.: 18/535,614

(22) Filed: Dec. 11, 2023

(65) Prior Publication Data

US 2024/0104457 A1 Mar. 28, 2024

Related U.S. Application Data

(63) Continuation of application No. 16/942,582, filed on Jul. 29, 2020, now Pat. No. 11,853,933.

(51) Int. Cl.
*G06Q 10/0631* (2023.01)
*G06N 5/04* (2023.01)
(Continued)

(52) U.S. Cl.
CPC ....... *G06Q 10/063114* (2013.01); *G06N 5/04* (2013.01); *G06N 20/00* (2019.01);
(Continued)

(58) Field of Classification Search
CPC ..... G06Q 10/063114; G06Q 10/06316; G06Q 10/10; G06Q 30/016; G06Q 30/0185; G06Q 40/02; G06N 5/04; G06N 20/00
See application file for complete search history.

(56) References Cited

U.S. PATENT DOCUMENTS 8,417,604 B2  4/2013  Orr et al.
8,583,090 B2 * 11/2013  Vartiainen ............. G06F 9/4856
                                                        455/39

(Continued)

FOREIGN PATENT DOCUMENTS

WO    WO-01/16851 A2      3/2001
WO    WO2001016851 A2 *   3/2001
WO    WO-2012/174427 A2  12/2012

OTHER PUBLICATIONS

X. Zhang et al., "Personalized Digital Customer Services for Consumer Banking Call Centre using Neural Networks," 2020 International Joint Conference on Neural Networks (IJCNN), Glasgow, UK, 2020, pp. 1-7, doi: 10.1109/IJCNN48605.2020.9206709 (Year: 2020).*

(Continued)

*Primary Examiner* — Jerry O'Connor
*Assistant Examiner* — Jeremy L Gunn
(74) *Attorney, Agent, or Firm* — Foley & Lardner LLP

(57) ABSTRACT

A method performed by a provider computing system includes training one or more artificial intelligence (AI) models to generate task prompts, receiving a requested action from a customer, determining contextual information about a plurality of customer devices, generating a task prompt using the one or more AI models, generating an interaction board accessible by the customer via a customer device and accessible by an employee via an employee device, receiving an indication that the customer pre-task has been completed prior to a customer interaction at a (Continued)

branch location, updating the interaction board to indicate that the customer pre-task has been completed prior to the customer interaction, receiving information associated with the requested action from the customer device during the customer interaction, and updating the interaction board to include the information received from the customer device during the customer interaction.

20 Claims, 3 Drawing Sheets

(51) Int. Cl.
   *G06N 20/00* (2019.01)
   *G06Q 10/10* (2023.01)
   *G06Q 30/016* (2023.01)
   *G06Q 30/018* (2023.01)
   *G06Q 40/02* (2023.01)

(52) U.S. Cl.
   CPC ....... *G06Q 10/06316* (2013.01); *G06Q 10/10* (2013.01); *G06Q 30/016* (2013.01); *G06Q 30/0185* (2013.01); *G06Q 40/02* (2013.01)

(56) References Cited

U.S. PATENT DOCUMENTS

| | | | |
|---|---|---|---|
| 8,831,677 B2 | 9/2014 | Villa-Real | |
| 9,355,530 B1* | 5/2016 | Block | G06Q 20/405 |
| 10,033,702 B2 | 7/2018 | Ford et al. | |
| 10,163,023 B2* | 12/2018 | Jones | G07D 11/12 |
| 2012/0095908 A1* | 4/2012 | Barrie | G06F 9/5038 |
| | | | 705/39 |
| 2012/0159341 A1* | 6/2012 | Murillo | G06Q 10/06 |
| | | | 715/739 |
| 2013/0103582 A1 | 4/2013 | Singfield | |
| 2014/0201084 A1 | 7/2014 | Dagenais et al. | |
| 2015/0066765 A1* | 3/2015 | Banks | G06Q 20/023 |
| | | | 705/44 |
| 2015/0281009 A1* | 10/2015 | Melcher | H04L 43/04 |
| | | | 709/224 |
| 2015/0302413 A1* | 10/2015 | Dua | H04B 5/77 |
| | | | 705/44 |
| 2016/0012465 A1 | 1/2016 | Sharp | |
| 2016/0019642 A1* | 1/2016 | Dash | G06Q 40/03 |
| | | | 705/38 |
| 2016/0048784 A1 | 2/2016 | Moore et al. | |
| 2016/0283940 A1 | 9/2016 | Streuter et al. | |
| 2017/0103382 A1 | 4/2017 | Kim et al. | |
| 2019/0197814 A1 | 6/2019 | Senguttuvan et al. | |
| 2019/0213498 A1 | 7/2019 | Adjaoute | |
| 2020/0184420 A1* | 6/2020 | Dange | G06F 16/93 |
| 2020/0364404 A1* | 11/2020 | Priestas | G06V 30/19173 |

OTHER PUBLICATIONS

Translation of WO2001016851A2 (Year: 2001).*
English Translation of WO2001016851A2 (Year: 1999).

* cited by examiner

SYSTEMS AND METHODS FOR AN INTERACTIVE CUSTOMER INTERFACE UTILIZING CUSTOMER DEVICE CONTEXT

CROSS-REFERENCE TO RELATED APPLICATIONS

This application is a continuation of U.S. patent application Ser. No. 16/942,582 filed Jul. 29, 2020, which is incorporated herein by reference in its entirety and for all purposes.

TECHNICAL FIELD

The present application relates to improving customer interactions at a branch location associated with a provider (e.g., a financial institution). More particularly, the present application relates to systems and methods allowing for customers and various parties associated with the provider to complete various tasks prior to, during, and after a customer interaction at a branch location.

BACKGROUND

Many providers (e.g., credit card issuers, banks, retailers, service providers) provide a wide array of potential services to customers. Some providers allow customers to schedule appointments to perform various requested actions so that the provider can perform various tasks associated with the requested actions before the scheduled appointment to improve efficiency during the scheduled appointment. However, some requested actions require several tasks to be performed by various parties associated with the requested action to adequately prepare for the scheduled appointment. Requiring various parties to perform various tasks and to coordinate with one another in advance of a scheduled appointment can be challenging.

SUMMARY

One example embodiment relates to a method. The method comprises receiving, by a provider computing system associated with a provider, a requested action from a customer. The method further comprises identifying, by the provider computing system, a customer task for completion of the requested action to be performed by the customer. The method further comprises generating, by the provider computing system, an interaction board accessible by the customer via a customer device associated with the customer and accessible by an employee associated with the provider via an employee device associated with the employee. The interaction board is displayed via a graphical user interface and includes the customer task. The method further comprises receiving, by the provider computing system, an indication that the customer task has been completed prior to a customer interaction at a branch location. The customer interaction is associated with the requested action. The branch location is associated with the provider. The method further comprises updating, by the provider computing system, the interaction board to indicate that the customer task has been completed prior to the customer interaction. The method further comprises receiving, by the provider computing system, information associated with the requested action from the customer device during the customer interaction. The method further comprises updating, by the provider computing system, the interaction board to include the information received from the customer device during the customer interaction.

Another example embodiment relates to a method. The method comprises receiving, by a provider computing system, a requested action from a customer. The method further comprises identifying, by the provider computing system, a customer task for completion of the requested action to be performed by the customer. The method further comprises determining, by the provider computing system, contextual information about a plurality of customer devices associated with the customer. The method further comprises identifying, by the provider computing system, a customer device of the plurality of customer devices based on the customer task and the contextual information. The method further comprises generating, by the provider computing system, a task prompt requesting the customer to perform the customer task based on the contextual information. The method further comprises transmitting, by the provider computing system, the task prompt to the customer device.

Another example embodiment relates to a customer interaction system comprising a provider computing system. The provider computing system is associated with a provider and configured to communicate with a customer device associated with a customer and with an employee device associated with an employee of the provider via a network. The provider computing system comprises a processing circuit including a processor and a memory. The processing circuit is structured to receive a requested action from the customer via the customer device. The processing circuit is further structured to identify a customer task for completion of the requested action to be performed by the customer. The processing circuit is further structured to generate an interaction board accessible by the customer via the customer device and the employee via the employee device. The interaction board is displayed via a graphical user interface and includes the customer task. The processing circuit is further structured to receive an indication that the customer task has been completed prior to a customer interaction at a branch location. The customer interaction is associated with the requested action. The branch location is associated with the provider. The processing circuit is further structured to update the interaction board to indicate that the customer task has been completed prior to the customer interaction. The processing circuit is further structured to receive information associated with the requested action from the customer device during the customer interaction. The processing circuit is further structured to update the interaction board to include the information received from the customer device during the customer interaction.

These and other features, together with the organization and manner of operation thereof, will become apparent from the following detailed description when taken in conjunction with the accompanying drawings.

DETAILED DESCRIPTION

Figure 1:
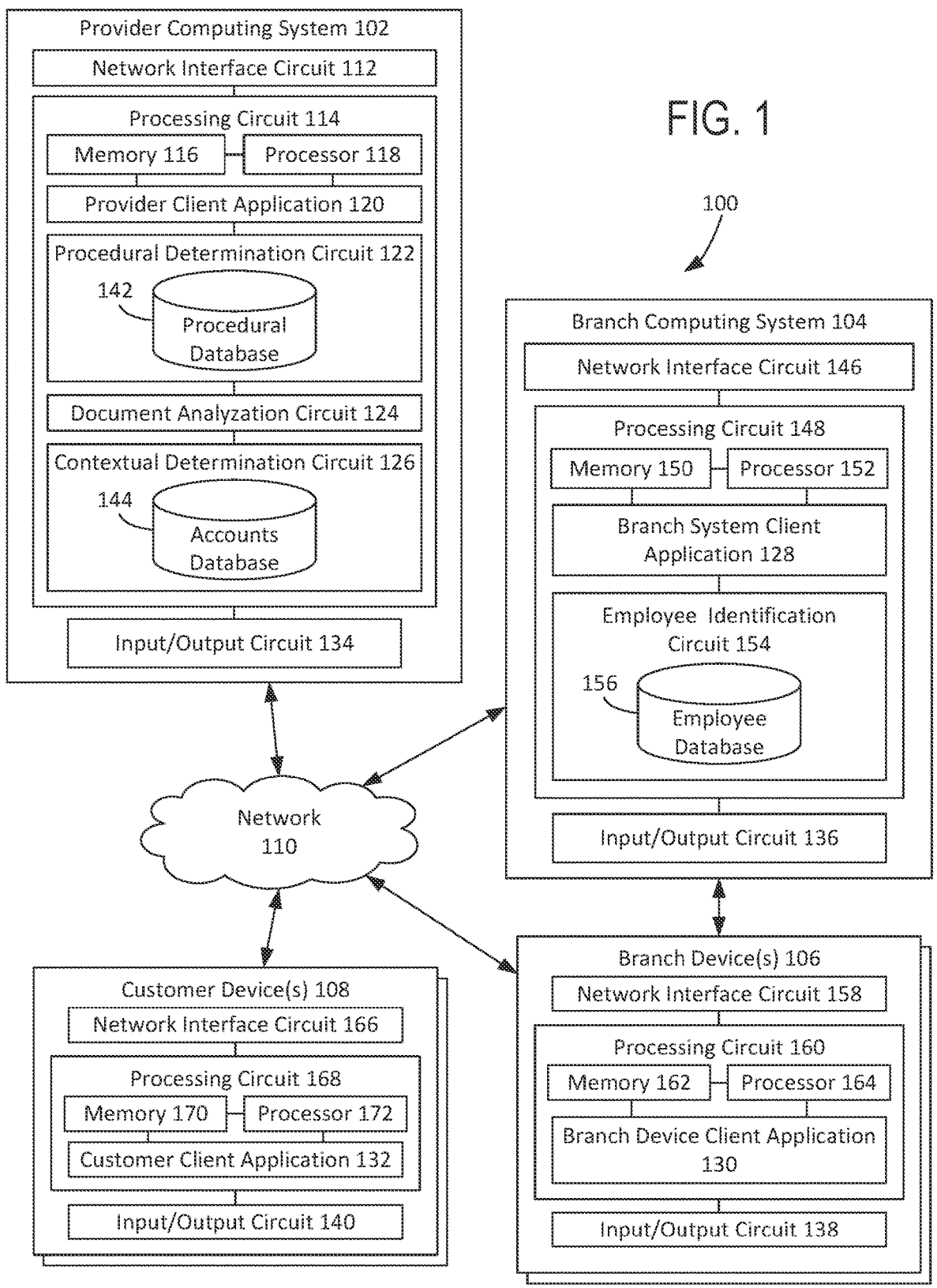
FIG. 1 is a diagram of a customer interaction system, according to an example embodiment.

Referring generally to the figures, systems and methods for completing an action requested by a customer at a branch location associated with a provider are shown and described. The systems and methods described herein allow for various tasks necessary for the completion of the action requested by a customer to be efficiently performed by determining appropriate task prompts based, at least in part, on contextual information pertaining to various customer devices associated with the customer. For example, in some instances, a requested action may require that the customer provide various information (e.g., documents, forms, and/or other information) to the system to complete the requested action. The systems and methods described herein may determine the most efficient and/or convenient manner to request the necessary information by reaching out to various active customer devices to gradually accumulate necessary information from the customer over time ahead of a scheduled customer interaction. Accordingly, the systems and methods described herein reduce the time required to perform the requested action during a scheduled customer interaction.

Further, the systems and methods described herein provide an open platform or "interaction board" where the various parties (e.g., the customer, the branch employee(s), the branch manager, the provider employee(s)) associated with the requested action can add, update, replace, mark as complete, and/or communicate with each other regarding the various tasks associated with the requested action. For example, a given requested action may be to open, modify, close, or add an authorized user to a financial account at a branch location of a provider. Any of these actions may require the customer to provide various information (e.g., documents, forms, and/or other necessary information) and/or approvals to the branch location or the provider. Once the customer has provided the necessary materials and/or information, a branch employee or branch manager may need to subsequently enter or otherwise use the information and/or approvals provided by the customer (e.g., directly or via various documents/forms) to perform the task of opening the new financial account. Additionally, a separate branch employee or branch manager may have to run a separate background check on the customer or perform some other relevant task.

Accordingly, a single requested action may have several tasks associated therewith that are necessary for completing the requested action, and each of these tasks may need to be performed by multiple, separate parties or entities. The various systems and methods described herein allow the various parties to continuously update and communicate via a mutually-visible interaction board throughout the process of completing the requested action, thereby providing transparency throughout the process of completing the requested action. Accordingly, the interaction board may improve and increase user engagement with a branch location, because it allows the user to periodically check in and communicate with relevant personnel at the branch location or associated with the provider generally regarding their requested action or actions, and which further results in streamlined branch appointments for the user.

Referring now to FIG. 1, a block diagram of a customer interaction system 100 is shown, according to an example embodiment. The customer interaction system 100 includes, among other systems, a provider computing system 102, a branch computing system 104, one or more branch devices (e.g., employee or branch device 106), and one or more customer devices (e.g., customer device 108). The provider computing system 102, the branch computing system 104, the branch device 106 (as well as any additional branch devices), and the customer device 108 (as well as any additional customer devices) may communicate directly or through a network 110, which may include one or more of the Internet, cellular network, Wi-Fi, Wi-Max, a proprietary banking network, a proprietary retail or service provider network, or any other type of wired or wireless network.

The provider computing system 102 may be managed by a provider, such as a credit card issuer, a bank, a retailer, a service provider, or the like. The provider computing system 102 includes a network interface circuit 112, a processing circuit 114, and an input/output circuit 134. The network interface circuit 112 is structured and used to establish connections with other computing systems and devices (e.g., the branch computing system 104, the branch devices 106, the customer devices 108) by way of the network 110. The network interface circuit 112 includes program logic that facilitates connection of the provider computing system 102 to the network 110. For example, the network interface circuit 112 may include any combination of a wireless network transceiver (e.g., a cellular modem, a Bluetooth transceiver, a WiFi transceiver, etc.) and/or a wired network transceiver (e.g., an Ethernet transceiver). In some arrangements, the network interface circuit 112 includes the hardware and machine-readable media sufficient to support communication over multiple channels of data communication. Further, in some arrangements, the network interface circuit 112 includes cryptography capabilities to establish a secure or relatively secure communication session in which data communicated over the session is encrypted.

The processing circuit 114 includes a memory 116, a processor 118, a provider client application 120, a procedural determination circuit 122, a document analyzation circuit 124, and a contextual determination circuit 126. The memory 116 may be one or more devices (e.g., RAM, ROM, Flash memory, hard disk storage) for storing data and/or computer code for completing and/or facilitating the various processes described herein. Memory 116 may be or include non-transient volatile memory, non-volatile memory, and non-transitory computer storage media. Memory 116 may include database components, object code components, script components, or any other type of information structure for supporting the various activities and information structures described herein. Memory 116 may be communicably coupled to the processor 118 and include computer code or instructions for executing one or more processes described herein. The processor 118 may be implemented as one or more application specific integrated circuits (ASICs), field programmable gate arrays (FPGAs), a group of processing components, or other suitable electronic processing components. As such, the provider computing system 102 is configured to run a variety of application programs and store associated data in a database of the memory 116. One such application may be the provider client application 120.

The provider client application 120 is structured to provide displays to the provider computing system 102 to allow for improved interactions between customers and branch employees and/or a branch manager at a branch location associated with the branch computing system 104. Specifically, the provider client application 120 is configured to communicate with the branch computing system 104, the branch devices 106, and the customer devices 108 to provide various instructions and reminders to customers and branch employees to perform various tasks associated with a customer interaction before, during, and after the customer interaction. In some instances, a customer interaction may be a scheduled physical meeting, a scheduled phone call, an upcoming branch visit, or any other type of customer interaction between the customer and a branch employee, branch manager or provider employee aimed at completing a requested action. Accordingly, the provider client application 120 is communicably coupled to the branch computing system 104 (e.g., through interactions with a branch system client application 128), the branch devices 106 (e.g., through interactions with a branch device client application 130), and the customer devices 108 (e.g., through interactions with the customer client application 132).

The provider client application 120 may thus communicate with the branch computing system 104, the branch devices 106, and the customer devices 108 to perform a variety of functions. For example, as will be described herein, the provider client application 120 is configured to receive an action initiation trigger; determine an action requested for completion by the customer; identify a list of necessary tasks for completion of the requested action to be performed by the customer, branch employees, a branch manager, and/or provider employees; generate appropriate task prompts for completion of the identified tasks; transmit the task prompts to the customer, the branch employee, and/or the branch manager; and generate and maintain an interaction board (e.g., similar to interaction board 300 shown in FIG. 3) detailing completion progress of the requested action and enabling continuous communication between the customer, the branch employees, the branch manager, and/or the provider employees.

Accordingly, the displays presented to the user via the provider client application 120 may provide various prompts to a provider employee to submit information and/or preferences to the provider client application 120. For example, in some arrangements, the provider client application 120 is configured to receive a requested action from a customer from any of the branch computing system 104, the branch devices 106, and/or the customer devices 108.

In some instances, based on the requested action, the provider client application 120 may be further configured to authenticate a customer. For example, the authentication may be accomplished via a near-field communication (NFC) or radio-frequency identification (RFID) device associated with the provider (e.g., at a branch location) authenticating the customer by pairing with one of the customer devices 108. For example, in some instances, the provider may make a microdeposit into an account of the customer via NFC, and the customer may be authenticated by confirming the microdeposit amount. In some other instances, the customer may tap their device (e.g., a mobile phone or a smart card) to the NFC or RFID device (e.g., at a door or counter within the branch), which may authenticate the customer by sharing a unique device identifier with the provider computing system 102. In some instances, the customer may authenticate by providing and swiping a card associated with the provider (e.g., a bankcard, a credit card, a debit card).

The provider client application 120 may then be configured to prompt a provider employee to provide an initial indication of the necessary tasks associated with various requestable actions. In some instances, the necessary tasks may comprise pre-tasks that may or must be done before a customer interaction, interaction tasks that may or must be completed during the customer interaction, and post-tasks that may or must be done following a customer interaction. In some embodiments, the necessary tasks may comprise various documents for submitting to the provider, required signatures, required notarizations, required approvals, and/or identification forms to be provided, filled out, and/or signed by a customer and/or a branch employee, or any other necessary tasks that may be associated with given requestable actions.

Accordingly, the provider computing system 102 is configured to push or otherwise transmit various information (e.g., documents and/or forms to be filled out and/or signed) and/or approval requests to the customer (e.g., via the customer client application 132), branch employees (e.g., via the branch device client application 130), and the branch manager (e.g., via the branch system client application 128). The provider computing system 102 may further be configured to push various advertisements to the customer for services that are related to the action requested by the customer. In some instances, the provider computing system 102 may store the various documents, forms, and/or advertisements in the memory 116 and/or the procedural database 142. In some instances, the provider computing system 102 may additionally or alternatively be configured to communicate with various remote and/or third-party servers through corresponding application programming interfaces (APIs) that are configured to provide access to the various documents, forms, and/or advertisements, which may be stored within corresponding remote server databases.

In some arrangements, the provider client application 120 may prompt the provider employee (or a branch manager or branch employee via the branch system client application 128 and/or the branch device client application 130) to provide an initial indication and/or explanation of the pertinent portions of documents, forms, and/or requested information associated with the various requestable actions. In some instances, the provider client application 120 may communicate with the document analyzation circuit 124 to determine the pertinent portions.

In either case, the pertinent portions of the various documents and/or forms may be, for example, important pages, key passages, required signatures, information entry sections, or any other portions of the documents, forms, and/or requested information that are deemed pertinent to completing the corresponding requestable action. For example, in some instances, to indicate the pertinent portions, the provider employee, the branch manager, the branch employee(s), and/or the document analyzation circuit 124 may annotate (e.g., highlight, circle) the pertinent portions. In some other instances, the provider employee, the branch manager, the branch employee(s), and/or the document analyzation circuit 124 may alternatively or additionally provide a separate communication indicating the pertinent portions (e.g., "please look at page 7 and provide your signature at lines 8 and 25."). The separate communication could be, for example, a text message, a push notification, a voice message (e.g., human voice or an automated chat bot), a video message, or any other suitable communication format. The explanation of the various pertinent portions may provide information as to why the pertinent portion is important to the customer, why the pertinent portion is important to completing the requested action, and/or any other relevant information about the pertinent portion. In some instances, the explanation may further include a general description of what the document is and how the pertinent portions fit into the document as a whole.

In some arrangements, the provider client application 120 may then be configured to transmit a task prompt or notification to any of the associated parties (e.g., the customer, a branch employee, a branch manager, a provider employee) requesting that the associated party employee complete the necessary tasks associated with a given requested action. In some arrangements, the provider client application 120 may further be configured to periodically remind the associated parties that various tasks associated with the requested action have not been completed. The foregoing prompts, as well as additional examples, will be described in detail herein.

As alluded to above, the provider client application 120 is further configured to generate and maintain (e.g., continuously or periodically update) an interaction board detailing completion progress of the requested action and any communications between the associated parties. For example, the interaction board may be a type of repository or virtual dossier detailing a requested action or a plurality of requested actions, as well as the tasks associated with each requested action. The interaction board may be continuously or periodically updated to show a list of completed tasks, a list of pending tasks, and any communications provided by associated parties pertaining to each requested action.

Accordingly, the provider client application 120 (e.g., via the interaction board) may ensure that the customer, branch employees, the branch manager, and/or the provider employees are continuously apprised of the current status of the various tasks associated with each requested action. Additionally, the provider client application 120 (e.g., via the interaction board) may provide an open communication path between the customer, the branch employees, the branch manager, and the provider employees to allow for various questions, comments, concerns, and/or reminders pertaining to the various tasks associated with each requested action to be effectively communicated. Furthermore, the interaction board provided by the provider client application 120 may be configured such that the customer, branch employees, the branch manager, and/or the provider employees may push and/or pull documents, forms, and/or necessary information to or from the interaction board, as necessary to complete the various tasks associated with the requested action or actions.

In some instances, the interaction board provided by the provider client application 120 may be further configured to automatically push and/or pull information (e.g., documents, forms, and/or other necessary information) to and/or from customer (e.g., the customer devices 108), the branch employees (e.g., the branch devices 106), the branch manager (e.g., the branch computing system 104), and/or the provider employees (e.g., the provider computing system 102), as necessary to complete the various tasks associated with the requested action or actions. Accordingly, in some instances, the provider client application 120 allows for the various documents, forms, and/or other necessary information to be pushed to and/or pulled from the customer (e.g., the customer devices 108) without direct input from a branch employee, branch manager, provider employee, etc. Further, the interaction board allows for various information to be pushed to and/or pulled from the customer (e.g., the customer device 108) prior to, during, and after a scheduled customer interaction at a branch location associated with the provider.

In some embodiments, the provider client application 120 may be incorporated with an existing application in use by the provider computing system 102 (e.g., a mobile banking application, a service provider application, etc.). In other embodiments, the provider client application 120 is a separate software application implemented on the provider computing system 102. The provider client application 120 may be downloaded by the provider computing system 102 prior to its usage, hard coded into the memory 116 of the provider computing system 102, or be a network-based or web-based interface application such that the provider computing system 102 may provide a web browser to access the application, which may be executed remotely from the provider computing system 102. Accordingly, the provider computing system 102 may include software and/or hardware capable of implementing a network-based or web-based application. For example, in some instances, the provider client application 120 includes software such as HTML, XML, WML, SGML, PHP (Hypertext Preprocessor), CGI, and like languages.

In the latter instance, the user (e.g., a provider employee) may have to log onto or access the web-based interface before usage of the application. Further, and in this regard, the provider client application 120 may be supported by a separate computing system including one or more servers, processors, network interface circuits, etc. that transmit applications for use to the provider computing system 102.

In certain embodiments, the provider client application 120 includes an application programming interface (API) and/or a software development kit (SDK) that facilitate the integration of other applications with the provider client application 120. For example, in some embodiments, the provider client application 120 is configured to utilize the functionality of the branch computing system 104 by interacting with the branch system client application 128 through an API.

The procedural determination circuit 122 is structured to receive the requested action from the provider client application 120 and to determine various procedural information associated with completing the requested action. For example, in some instances, the procedural determination circuit 122 includes a procedural database 142. The procedural database 142 is structured to retrievably store procedural information pertaining to a variety of requestable actions.

The requestable actions may generally fall into one of at least four categories. The first category may be an in-session requested action that may be performed without a branch employee, a branch manager, or a provider employee, where the customer must be authenticated to perform the requested action (e.g., delegation, authentication). The second category may be an out-of-session requested action that may be performed without a branch employee, a branch manager, or a provider employee, where the customer does not need to be authenticated to perform the requested action (e.g., locating a branch, locating an ATM, authentication). The third category may be an in-session requested action that must be performed with a branch employee, a branch manager, or a provider employee, where the customer must be authenticated to perform the requested action (e.g., approval, consent, co-browsing, authentication). The fourth category may be an out-of-session requested action that must be performed with a branch employee, a branch manager, or a provider employee, where the customer does not need to be authenticated to perform the requested action (e.g., authentication). Accordingly, in some instances, based on the requested action provided by the customer, the provider computing system 102 may automatically authenticate the customer, as described above.

For example, the requestable actions may include opening a new account (e.g., checking, debit, credit, trust), modifying an existing account (e.g., adding an authorized user to the existing account), closing an account, applying for a loan (e.g., personal, mortgage, school), etc. It will be appreciated that the systems and methods described herein may be used with or adapted to a variety of requestable actions having associated tasks necessary for completion. Accordingly, it will be understood that the various embodiments provided herein are provided as examples, and are in no way meant to be limiting.

The procedural information may include a list of tasks associated with each requestable action. For example, for each requestable action, it may be necessary for the customer, branch employee, and/or the branch manager to provide, fill out, notarize, and/or sign a variety of documents, information, and/or identification forms for completion of the requested action. The procedural information may further include various tasks requirements associated with each of the identified tasks. The various task requirements may include user authentication, employee oversight, branch manager oversight, heightened branch security, notary signature, or any other pertinent task requirements. The procedural information may further include an action category (e.g., personal, home mortgage, credit application) for the requested action, task details associated with the list of tasks, an indication of who is responsible for completing each task associated with the requestable action (e.g., the customer, a branch employee, a branch manager, a provider employee).

In some instances, the procedural information may further include an indication and/or explanation of the pertinent portions of the various documents, forms, and/or requested information associated with each of the various tasks. For example, the procedural determination circuit 122 may be configured to communicate with the document analyzation circuit 124 to identify the pertinent portions of the various documents, forms, and/or requested information associated with each of the tasks stored within the procedural database 142.

The document analyzation circuit 124 is communicably and operably coupled to the provider client application 120, the procedural determination circuit 122, the branch computing system 104, the branch devices 106, and the customer devices 108. In some instances, the document analyzation circuit 124 is configured to receive various inputs from any of the provider computing system 102 (e.g., from a provider employee via the input/output circuit 134), the branch computing system 104 (e.g., from a branch manager via the input/output circuit 136), the branch devices 106 (e.g., from a branch employee via the input/output circuit 138), and/or the customer devices 108 (e.g., from a customer via the input/output circuit 140). The inputs received may be manual indications, identifications, and/or explanations of the pertinent portions of the various documents and/or forms associated with each of the requestable actions stored in the procedural database 142. Accordingly, the document analyzation circuit 124 is configured to receive the identified list of tasks necessary for completing a given requested action from the procedural determination circuit 122, identify the various documents, forms, and/or requested information associated with the list of tasks, identify the pertinent portions of the various documents, forms, and/or requested information, and communicate the pertinent portions and any associated explanations back to the procedural determination circuit 122.

In some instances, the document analyzation circuit 124 is additionally or alternatively configured to incorporate artificial intelligence (AI) models to study the inputs received and/or historical data pertaining to the pertinent portions of the various documents, forms, and/or requested information associated with each requestable action. That is, the AI models can be trained to both identify and provide explanations for the pertinent portions of the various documents, forms, and/or requested information associated with each requestable action by studying user inputs over time and/or historical data related to similar documents, forms, and/or requested information.

For example, the document analyzation circuit 124 may be structured to identify various required signatures within a document to be filled out by the customer. The document analyzation circuit 124 may further be structured to identify various information entry areas throughout a document and identify the type of information to be provided in each information entry area. For example, the document analyzation circuit 124 may be configured to identify the type of information as, for example, name, job title, salary, marital status, and/or any other potential information types that may pertain to the different information entry areas. The document analyzation circuit 124 may further be configured to continuously learn and identify new information types via the AI models studying various inputs received over time.

Additionally, the document analyzation circuit 124 may be configured to receive feedback from the provider employee, the branch manager, the branch employee and/or the customer (e.g., received from the users' corresponding systems and/or devices) to gradually modify, update, and/or further train the AI models. For example, the document analyzation circuit 124 may employ any suitable machine learning method, such as regression, gradient boosting, neural networks, and/or any other tools deemed suitable for a given application.

Accordingly, in some instances, the document analyzation circuit 124 is configured to identify the pertinent portions and any associated explanations of the documents, forms, and/or requested information based on inputs received from the provider employee, the branch manager, the branch employee, and/or the customer. In some instances, the document analyzation circuit 124 is configured to identify the pertinent portions and any associated explanations of the documents, forms, and/or requested information based on AI models trained using the inputs received from the provider employee, the branch manager, the branch employee, and/or the customer. In some other instances, the document analyzation circuit 124 is configured to identify the pertinent portions and any associated explanations of the documents, forms, and/or requested information based on a combination of the inputs received from the provider employee, the branch manager, the branch employee, and/or the customer and the trained AI models.

The contextual determination circuit 126 is configured to determine a variety of contextual information pertaining to the customer. The contextual determination circuit 126 may be communicably and operably coupled to the provider client application 120, the procedural determination circuit 122, the branch computing system 104, the branch devices 106, and/or the customer devices 108 to receive and/or transmit various contextual information pertaining to the customer.

In some instances, the contextual determination circuit 126 includes an accounts database 144 configured to store information pertaining to various customer accounts associated with the provider. In some instances, the accounts database 144 may act as a system of record and be configured to store various information pertaining to past customer interactions and general customer account history. For example, the accounts database 144 may store various feedback and/or responses provided by the customer during customer interactions. Accordingly, the various feedback and/or responses from each customer interaction may be used by the contextual determination circuit 126 and the procedural determination circuit 122 when generating the various task prompts discussed herein. The accounts database 144 may further store a list of approved customer devices 108 associated with each customer account. The approved customer devices 108 may be a set of customer devices 108 that the corresponding customer has indicated for use with the provider client application 120, the branch system client application 128, the branch device client application 130, and/or the customer client application 132.

As will be described herein, the approved customer devices 108 may be a variety of suitable user computing devices. For example, the approved customer devices 108 may comprise mobile phones, personal computers (e.g., desktop computers or laptop computers), tablets, smart watches or other wearable devices, headphones, smart vehicle voice/touch command systems, virtual/augmented reality (VR/AR) systems (e.g., smart glasses), appliances, internet of things (IoT) devices, voice assistants, at-home touch screen display systems, and/or any other suitable user computing devices capable of accessing and communicating using local and/or global networks (e.g., the network 110). Accordingly, the accounts database 144 may be further configured to store device information pertaining to each approved customer device 108. For example, the device information may include a device form (e.g., what type of device the customer device 108 is), a set of device capabilities (e.g., types of input/output devices, device mobility, device communication capabilities), and device location information.

The contextual determination circuit 126 is structured to communicate with the various customer devices 108 to receive a corresponding device status from each customer device. For example, the device status may include an indication of whether the device is active and a device location. Accordingly, using the various device statuses, the contextual determination circuit 126 may determine a list of active customer devices 108 from the list of approved customer devices 108. For example, in some instances, the active customer devices 108 may include one or more customer devices 108 that are currently being used by the customer. In some instances, the active customer devices 108 may include one or more customer devices 108 that the customer has indicated to allow the provider computing system 102, the branch computing system 104, and/or the branch devices 106 to push and pull information and requests to and from. In some instances, the active customer devices 108 may include one or more customer devices 108 that are within a predetermined distance from the branch computing system 104 and/or one or more branch devices 106.

In some instances, the contextual determination circuit 126 may be structured to receive the device locations from the corresponding customer devices 108. In some instances, the customer may provide an indication to allow the provider computing system 102, the branch computing system 104, and/or one or more of the branch devices 106 to access geographical location information associated with one or more of the approved customer devices 108. The contextual determination circuit 126 may then be configured to determine the customer device location and/or movement status based on the geographical information associated with the corresponding customer device 108. For example, the contextual determination circuit 126 may be configured to determine whether the various customer devices 108 are at home, at work, driving, and/or at any other location of interest. Further, the contextual determination circuit 126 may be configured to determine whether any of the customer devices 108 are within the predetermined distance from the branch computing system 104 and/or the one or more branch devices 106 using the determined device locations.

In some instances, the contextual determination circuit 126 may alternatively or additionally be configured to determine whether any of the customer devices 108 are within a predetermined distance from the branch computing system 104 and/or the one or more branch devices 106 by automatically detecting that one or more of the customer devices 108 are within range of a network or a communication device associated with the branch computing system 104 and/or the one or more branch devices 106. For example, each of the branch computing system 104, the one or more branch devices 106 and/or one or more of the customer devices 108 may be Wi-Fi enabled and/or Bluetooth enabled, include various radio-frequency identification (RFID) and/or near-field communication (NFC) devices, and/or be equipped with any other suitable device connection technology. Accordingly, when one of the approved customer devices 108 is within range of the branch computing system 104 and/or the one or more branch devices 106, the branch computing system 104 and/or the one or more branch devices 106 may be configured to automatically connect to the customer devices 108 and transmit a notification to the contextual determination circuit 126 indicating that the customer device 108 is within a predetermined range.

The procedural determination circuit 122 is further structured to generate various task prompts to be transmitted to the branch computing system 104, the branch devices 106, and/or the customer devices 108. For example, in some instances, if a branch employee and/or a branch manager is responsible for completing various tasks associated with the requested action, the procedural determination circuit 122 may generate branch task prompts indicating that the branch employee and/or the branch manager is required for completion of the requested action. The procedural determination circuit 122 may then send the branch task prompts to the branch employee and/or the branch manager via the branch system client application 128. The branch task prompts may include a list of identified tasks to be completed by the branch employee and/or the branch manager, as well as an indication and/or explanation of the pertinent portions of the documents, forms, and/or required information associated with the identified tasks.

The procedural determination circuit 122 may similarly be structured to generate provider task prompts including a list of identified tasks to be completed by a provider employee. The procedural determination circuit 122 may then provide the provider task prompts to the provider employee via the input/output circuit 134.

The procedural determination circuit 122 may similarly be structured to generate customer task prompts including a list of identified tasks to be completed by the customer, as well as an indication and/or explanation of the pertinent portions of the documents, forms, and/or requested information associated with the requested action. In some instances, the procedural determination circuit 122 may generate multiple customer task prompts to be completed on different devices at different times. For example, the procedural determination circuit 122 may generate the various customer task prompts based on contextual information associated with the customer received from the contextual determination circuit 126.

That is, based on contextual information pertaining to the customer, the customer task prompts may be generated in varying forms to be presented or provided to the customer. For example, the contextual determination circuit 126 may provide the list of active customer devices 108, as well as the device information and device location associated with each active customer device 108, to the procedural determination circuit 122. Then, based on the list of active customer devices 108 and their associated contextual information, the procedural determination circuit 122 is structured to generate one or more appropriate customer tasks prompts having appropriate task prompt forms for each of the identified tasks to be performed by the customer.

For example, in some instances, the procedural determination circuit 122 may determine, based on the list of active customer devices 108 and their associated device information and locations, that only certain tasks may be requested at a given time using certain customer devices 108 having specific device capabilities. Thus, in some instances, the customer task prompt may be configured to be presented via a display, via an audio message, via a video message, via an automated chat bot, and/or via a variety of other manners, as will be described herein, depending on the contextual information pertaining to the customer and the customer devices 108 at the time of the task prompt.

In some instances, the procedural determination circuit 122 is configured to incorporate artificial intelligence (AI) models to determine and generate the various task prompts based on the identified tasks and the contextual information. For example, in some instances, the procedural determination circuit 122 may be trained using historical data pertaining to various example task prompts created in different scenarios (e.g., having a variety of differing task sets and contextual information). In some instances, the customer, branch employee(s), branch manager, and/or provider employee(s) may provide various feedback to the procedural determination circuit 122 to aid in the AI model training. In some instances, after a task prompt is generated and transmitted to the customer, a follow-up prompt may be generated for the customer requesting feedback. For example, the follow-up prompt may ask whether the customer task prompt was useful, convenient, and/or appropriate. The follow-up prompt may further ask the customer if they would prefer the customer task prompt to be provided in a different format or include more or less detail. As such, the AI models of the procedural determination circuit 122 can be continuously trained to ensure that the generated customer tasks prompts are appropriate and that the various tasks may be performed conveniently and efficiently. Similar to the document analyzation circuit 124, the procedural determination circuit 122 may employ any suitable machine learning method, such as regression, gradient boosting, neural networks, and/or any other tools deemed suitable for a given application.

The input/output circuit 134 is structured to receive communications from and provide communications to provider employees associated with the provider computing system 102. In this regard, the input/output circuit 134 is structured to exchange data, communications, instructions, etc. with an input/output component of the provider computing system 102. In one embodiment, the input/output circuit 134 includes an input/output device. In another embodiment, the input/output circuit 134 includes communication circuitry for facilitating the exchange of data, values, messages, and the like between an input/output device and the components of the provider computing system 102. In yet another embodiment, the input/output circuit 134 includes machine-readable media for facilitating the exchange of information between an input/output device and the components of the provider computing system 102. In still another embodiment, the input/output circuit 134 includes any combination of hardware components, communication circuitry, and machine-readable media.

For example, in some embodiments, the input/output circuit 134 comprises suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or manipulation purposes. That is, the input/output circuit 134 provides an interface for the user to interact with various applications (e.g., the provider client application 129) stored on the provider computing system 102.

The branch computing system 104 similarly includes a network interface circuit 146, a processing circuit 148, and an input/output circuit 136. The network interface circuit 146, the processing circuit 148, and the input/output circuit 136 may function substantially similar to and include the same or similar components as the network interface circuit 112, the processing circuit 114, and the input/output circuit 134 described above, with reference to the provider computing system 102. Accordingly, it will be understood that the description of the network interface circuit 112, the processing circuit 114, and the input/output circuit 134 of the provider computing system 102 provided above may be similarly applied to the network interface circuit 146, the processing circuit 148, and the input/output circuit 136 of the branch computing system 104.

For example, the network interface circuit 146 is similarly structured and used to establish connections with other computing systems (e.g., the provider computing system 102, the branch devices 106, the customer devices 108) by way of the network 110. The network interface circuit 146 may further include any or all of the components discussed above, with reference to the network interface circuit 112.

The processing circuit 148 similarly includes a memory 150 and a processor 152. The memory 150 and the processor 152 are substantially similar to the memory 116 and the processor 118 described above. As such, the branch computing system 104 is similarly configured to run a variety of application programs and store associated data in a database of the memory 150. One such application may be the branch system client application 128.

The branch system client application 128 may be substantially similar to the provider client application 120, but may instead be tailored toward branch employees or a branch manager. For example, branch system client application 128 is similarly structured to provide displays to the branch computing system 104 to allow for improved interactions between customers and branch employees and/or a branch manager at the branch location associated with the branch computing system 104. Specifically, the branch system client application 128 is configured to communicate with the provider computing system 102, the branch devices 106, and the customer devices 108 to receive instructions and reminders from the provider computing system 102 for branch employees and/or the branch manager to perform various tasks associated with a customer interaction. Accordingly, the branch system client application 128 is communicably coupled to the provider computing system 102 (e.g., through interactions with the provider client application 120), the branch devices 106 (e.g., through interactions with the branch device client application 130), and the customer devices 108 (e.g., through interactions with the customer client application 132).

The branch system client application 128 may thus communicate with the provider computing system 102, the branch devices 106, and the customer devices 108 to perform a variety of functions. For example, as will be described herein, the branch system client application 128 is configured to receive the instructions and reminders from the provider computing system 102 pertaining to necessary tasks to be performed by branch employees and/or a branch manager at the branch location for completion of the requested action. The branch system client application 128 may further be configured to allow for communication with the provider client application 120 to allow a branch employee or the branch manager to update a status of or provide questions, comments, or concerns pertaining to each necessary task on the interaction board. Accordingly, the branch system client application 128 allows for branch employees and the branch manager associated with the branch location to update the status of each task on the interaction board and effectively communicate with the customer and/or the provider employees throughout the process of completing the requested action.

The processing circuit 148 further includes an employee identification circuit 154. The employee identification circuit 154 is configured to match appropriate branch employees with various tasks identified and provided to the branch system client application 128. The employee identification circuit 154 may further include an employee database 156. The employee database 156 may be configured to store various employee information pertaining to various employees associated with the branch computing system 104. For example, the employee information may include the types of trainings each employee has received, the authorizations that each employee has obtained, a trustworthiness score for each employee, and any other pertinent information pertaining to each employee that may be used to determine the employees qualifications for performing various tasks associated with potential requestable actions.

Accordingly, in some instances, upon receiving the list of necessary tasks to be performed by the branch employees and/or the branch manager (e.g., via the branch task prompt), the employee identification circuit 154 may automatically identify appropriate branch employees and/or the branch manager for performing each identified task from the list of necessary tasks. For example, the employee identification circuit 154 may be configured to identify the appropriate branch employees and/or the branch manager based on the employee information and the tasks requirements associated with each of the identified tasks. In some other instances, in addition or alternatively, the branch manager may manually determine the appropriate branch employees for performing each identified task from the list of necessary tasks.

In either case, once the appropriate branch employees and/or the branch manager have been identified to perform each identified task, the employee identification circuit 154 is further structured to generate a branch manager task prompt and/or various branch employee task prompts including a list of identified tasks to be completed by each individual (e.g., individual branch employees and/or the branch manager). The employee identification circuit 154 is then structured to provide the various task prompts to the appropriate individuals. For example, the branch manager task prompt may be displayed to the branch manager on the branch computing system 104 (e.g., via the input/output circuit 136). The branch employee task prompts may be transmitted by the employee identification circuit 154 to the appropriate branch device 106 (e.g., the branch device client applications 130) associated with the appropriate branch employees.

Although the employee identification circuit 154 is depicted as being a part of the branch computing system 104, the employee identification circuit 154 may alternatively be a part of the provider computing system 102. In some other instances, each of the provider computing system 102 and the branch computing system 104 may include a corresponding employee identification circuit similar to the employee identification circuit 154.

The input/output circuit 136 may function substantially similarly to and include the same or similar components as the input/output circuit 134 described above, with reference to the provider computing system 102. Accordingly, it will be understood that the description of the input/output circuit 134 provided above may also be applied to the input/output circuit 136 of the branch computing system 104. For example, the input/output circuit 136 is similarly structured to receive communications from and provide communications to the branch employees and/or the branch manager associated with the branch computing system 104.

In some instances, the branch devices 106 may be employee devices (e.g., personal devices associated with various employees at a branch location) or branch devices associated with the branch location that specific employees may log into or otherwise access periodically. The branch devices 106 each similarly include a network interface circuit 158, a processing circuit 160, and an input/output circuit 138. The network interface circuit 158, the processing circuit 160, and the input/output circuit 138 may function substantially similar to an include the same or similar components as the network interface circuit 112, the processing circuit 114, and the input/output circuit 134 described above, with reference to the provider computing system 102. Accordingly, it will be understood that the description of the network interface circuit 112, the processing circuit 114, and the input/output circuit 134 of the provider computing system 102 provided above may be similarly applied to the network interface circuit 158, the processing circuit 160, and the input/output circuit 138 of each of the branch devices 106.

For example, the network interface circuit 158 is similarly structured and used to establish connections with other computing systems (e.g., the provider computing system 102, the branch computing system 104, the customer devices 108) by way of the network 110. The network interface circuit 158 may further include any or all of the components discussed above, with reference to the network interface circuit 112.

The processing circuit 160 similarly includes a memory 162 and a processor 164. The memory 162 and the processor 164 are substantially similar to the memory 116 and the processor 118 described above. As such, the branch devices 106 are similarly configured to run a variety of application programs and store associated data in a database of the memory 162. One such application may be the branch device client application 130.

The branch device client application 130 may be substantially similar to the provider client application 120 and the branch system client application 128, but may instead be specifically tailored to individual branch employees associated with each branch device 106. For example, the branch device client application 130 is similarly structured to provide displays to each branch device 106 to allow for improved interactions between customers and specific branch employees associated with each branch device 106. Specifically, the branch device client application 130 is configured to communicate with the provider computing system 102, the branch computing system 104, and the customer devices 108 to receive instructions and reminders from the provider computing system 102 and/or the branch computing system 104 for the branch employees associated with each branch device 106 to perform various tasks associated with a customer interaction. Accordingly, the branch devices 106 are communicably coupled to the provider computing system 102 (e.g., through interactions with the provider client application 120), the branch computing system 104 (e.g., through interactions with the branch system client application 128), and the customer devices 108 (e.g., through interactions with the customer client application 132).

The branch device client application 130 may thus communicate with the provider computing system 102, the branch computing system 104, and the customer devices 108 to perform a variety of functions. For example, as will be described herein, the branch device client application 130 is configured to receive the instructions and reminders from the provider computing system 102 and/or the branch computing system 104 pertaining to necessary tasks to be performed by the branch employee or branch employees associated with the corresponding branch device 106 for completion of the requested action. The branch device client application 130 is further configured to allow for communication with the provider client application 120 to allow the various branch employees associated with the various branch devices 106 to update a status of or provide questions, comments, or concerns pertaining to each necessary task on the interaction board. Accordingly, the branch device client application 130 allows for the branch employees associated with the branch devices 106 to update the status of each task on the interaction board and effectively communicate with the customer, branch manager, and/or provider employees throughout the process of completing the requested action.

The branch device client application 130 is further structured to allow the branch devices 106 to push and/or pull documents, forms, and/or necessary information to and/or from the interaction board, as necessary to complete their necessary tasks. In some instances, the branch device client application 130 may be configured to automatically push and/or pull the various documents, forms, and/or necessary information to and/or from the interaction board as necessary for the branch employees to complete their respective tasks. In some instances, the branch device client application 130 may be configured to temporarily store the various documents, forms, and/or necessary information, which may then be selectively transmitted to the interaction board upon receipt of instructions from the corresponding branch employee (e.g., received via the input/output circuit 138).

The input/output circuit 138 of each branch device 106 may function substantially similar to and include the same or similar components as the input/output circuit 134 described above, with reference to the provider computing system 102. Accordingly, it will be understood that the description of the input/output circuit 134 provided above may also be applied to the input/output circuit 138 of each of the branch devices 106. For example, the input/output circuit 138 of each branch device 106 is similarly structured to receive communications from and provide communications to the branch employee or branch employees associated with each branch device 106.

The customer devices 108 may each similarly include a network interface circuit 166, a processing circuit 168, and an input/output circuit 140. The network interface circuit 166, the processing circuit 168, and the input/output circuit 140 may function substantially similar to an include the same or similar components as the network interface circuit 112, the processing circuit 114, and the input/output circuit 134 described above, with reference to the provider computing system 102. Accordingly, it will be understood that the description of the network interface circuit 112, the processing circuit 114, and the input/output circuit 134 of the provider computing system 102 provided above may be similarly applied to the network interface circuit 166, the processing circuit 168, and the input/output circuit 140 of each of the customer devices 108.

For example, the network interface circuit 166 is similarly structured and used to establish connections with other computing systems (e.g., the provider computing system 102, the branch computing system 104, the branch devices 106) by way of the network 110. The network interface circuit 166 may further include any or all of the components discussed above, with reference to the network interface circuit 112.

The processing circuit 168 similarly includes a memory 170 and a processor 172. The memory 170 and the processor 172 are substantially similar to the memory 170 and the processor 172 described above. As such, the customer devices 108 are similarly configured to run a variety of application programs and store associated data in a database of the memory 170. One such application may be the customer client application 132.

The customer client application 132 may be substantially similar to the provider client application 120, the branch system client application 128, and the branch device client application 130, but may instead be specifically tailored to the customer associated with the customer devices 108. For example, the customer client application 132 is similarly structured to selectively provide displays and/or audio/visual communications to each customer device 108 to allow for improved interactions between the customer and branch employees, branch managers, and provider employees.

Specifically, the customer client application 132 is configured to communicate with the provider computing system 102, the branch computing system 104, and the branch devices 106 to receive instructions and reminders from the provider computing system 102, the branch computing system 104, and/or the branch devices 106 for the customer associated with the various customer devices 108 to perform identified tasks associated with the requested action. Accordingly, the customer devices 108 are communicably coupled to the provider computing system 102 (e.g., through interactions with the provider client application 120), the branch computing system 104 (e.g., through interactions with the branch system client application 128), and the branch devices 106 (e.g., through interactions with the branch device client application 130).

The customer client application 132 may thus communicate with the provider computing system 102, the branch computing system 104, and the branch devices 106 to perform a variety of functions. For example, the customer client application 132 is similarly configured to receive the instructions and reminders pertaining to the necessary tasks to be performed by the customer. The customer client application 132 is further configured to allow for communication with the provider client application 120 to allow the customer associated with the various customer devices 108 to update a status of and/or provide questions, comments, or concerns pertaining to each necessary task on the interaction board. Accordingly, the customer client application 132 allows for the customer to update the status of each of their tasks on the interaction board and effectively communicate with the branch manager, the branch employees, and/or the provider employees throughout the process of completing the requested action.

The customer client application 132 is further structured to allow the various customer devices 108 to push and/or pull documents, forms, and/or necessary information to and/or from the interaction board, as necessary to complete their necessary tasks. In some instances, the customer client application 132 may be configured to automatically push and/or pull various documents, forms, and/or necessary information to and/or from the interaction board upon receipt from the customer. In some instances, the customer client application 132 may be configured to temporarily store the various documents, forms, and/or necessary information, which may then be selectively transmitted to the interaction board upon receipt of instructions from the customer (e.g., received via the input/output circuit 140).

In some instances, the customer client application 132 may be configured to temporarily store the various documents, forms, and/or necessary information and then selectively transmit the various documents, forms, and/or necessary information to the interaction board upon the customer's arrival at a branch location. For example, as alluded to above, the customer device 108 may automatically connect to the branch computing system 104 and/or the one or more branch devices 106 when the customer device 108 is within range of a network or communication device associated with the branch computing system 104 and/or the one or more branch devices 106. Upon connecting to the branch computing system 104 and/or the one or more branch devices 106, the customer client application 132 may be configured to automatically push and/or pull various documents, forms, and/or necessary information to and/or from the interaction board for use during the customer interaction.

In some instances, the customer may specify differing levels of authority associated with each of the customer devices 108. For example, in some instances, the customer may set a first customer device 108 as a primary customer device and a second customer device 108 as a secondary customer device 108. The customer may set the primary customer device as having the authority to push and/or pull documents, forms, and/or necessary information to and/or from the interaction board. The customer may then set the second customer device as only having the authority to view various documents, forms, and/or necessary information on the interaction board. In some instances, there may be various approved users of the customer devices 108 beyond the customer (e.g., family members, caretakers, business partners). Accordingly, in some instances, the primary customer device may have the authority to veto or cancel the actions taken by a secondary customer device.

Furthermore, the customer client application 132 may be configured to automatically push device information and a device status for each customer device 108 to the contextual determination circuit 126 of the provider computing system 102. As alluded to above, the customer devices 108 may have a variety of form factors. For example, the customer devices 108 may comprise mobile phones, personal computers (e.g., desktop computers or laptop computers), tablets, smart watches or other wearable devices, headphones, smart vehicle voice/touch command systems, virtual/augmented reality (VR/AR) systems (e.g., smart glasses), appliances, internet of things (IoT) devices, voice assistants, at-home touch screen display systems, and/or any other suitable user computing devices capable of accessing and communicating using local and/or global networks (e.g., the network 110). Accordingly, the customer client application 132 may be configured to automatically provide device information comprising a device form (e.g., what type of device the customer device 108 is) and a set of device capabilities (e.g., the types of input/output devices, device mobility, device communication capabilities) for each customer device 108.

Additionally, the customer client application 132 may be configured to provide a device status for each customer device 108 to the contextual determination circuit 126 of the provider computing system 102. The device status may include both a device location and an indication of whether the corresponding device is active. For example, the customer client application 132 may be configured to automatically, periodically, and/or selectively provide geographical location information to the contextual determination circuit 126. Further, the customer client application 132 may be configured to send the contextual determination circuit 126 a notification and/or an update when a give customer device 108 is active.

As alluded to above, a customer device 108 may be considered active if, for example, the customer device 108 is currently being used by the customer, the customer has indicated that the provider computing system 102, the branch computing system 104, and/or the branch devices 106 are allowed to push and pull information and requests to and from the customer device 108, and/or the customer device 108 is within a predetermined distance from the branch computing system 104 and/or one or more branch devices 106. In some instances, there may be additional manners in which the customer device 108 may be considered active.

The input/output circuit 140 of each customer device 108 may function substantially similar to and include the same or similar components as the input/output circuit 134 described above, with reference to the provider computing system 102. Accordingly, it will be understood that the description of the input/output circuit 134 provided above may also be applied to the input/output circuit 140 of each of the customer devices 108. For example, the input/output circuit 140 of each customer device 108 is similarly structured to receive communications from and provide communications to the customer associated with the various customer devices 108.

Figure 2:
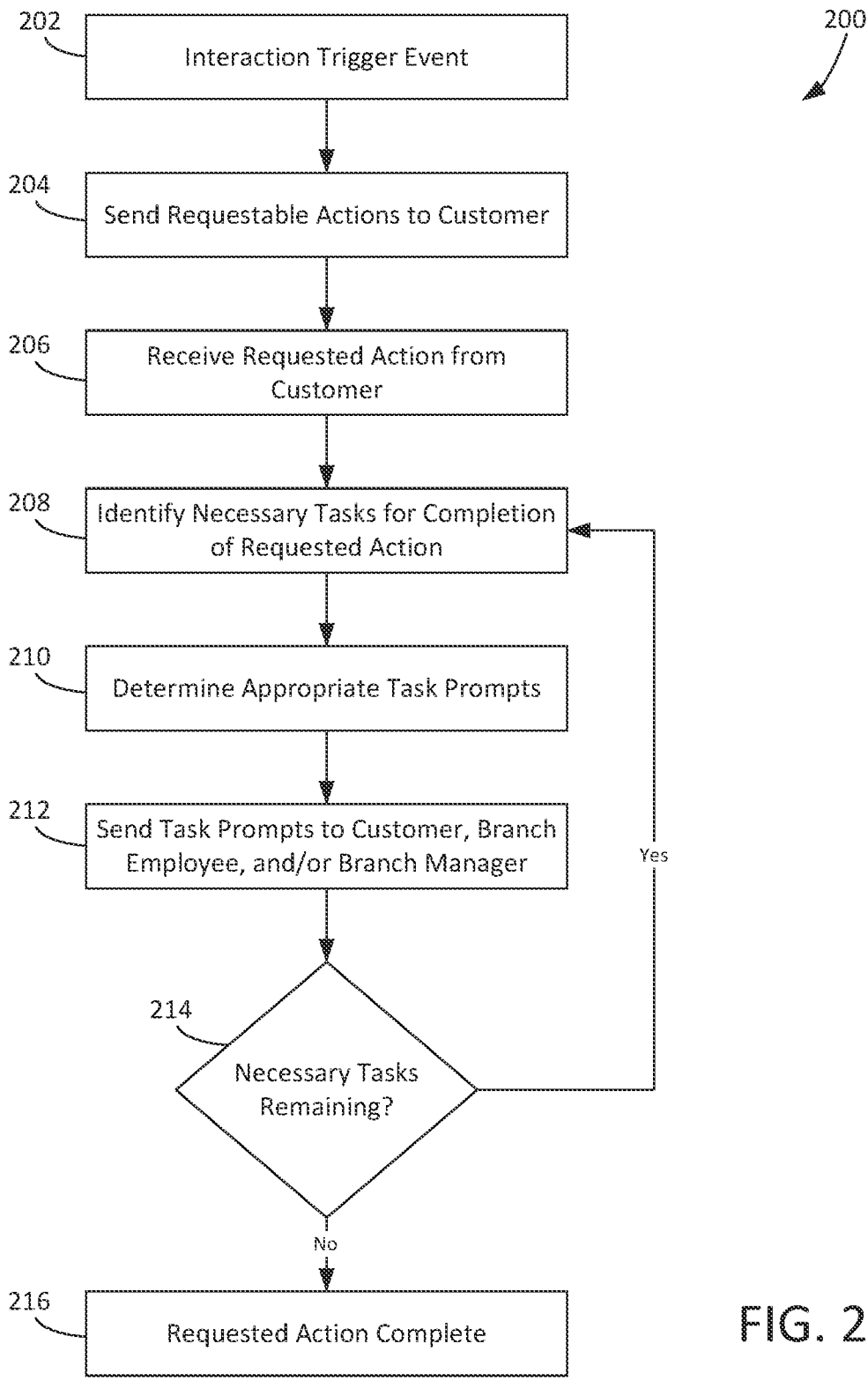
FIG. 2 is a flow diagram of a method for completing an action requested by a customer using the customer interaction system of FIG. 1, according to an example embodiment.

Referring to FIG. 2, a flow diagram of a method 200 for completing a requested action during an interaction with a customer using the interaction board provided and/or accessible by the provider client application 120, the branch system client application 128, the branch device client application 130, and the customer client application 132 is shown, according to an exemplary embodiment. The method 200 may be performed by the customer interaction system 100 described above.

The method 200 begins when an interaction trigger event happens, at step 202. An interaction trigger event can be a variety of events that may trigger an interaction between the customer and the branch employees, branch manager, and/or the provider. In some instances, an interaction trigger event may occur when a customer enters or gets near enough to a branch location. For example, when the customer enters or gets near enough to the branch location, the customer device(s) 108 associated with the customer that the customer is carrying or using may enter into a wireless communication range of various devices or systems (e.g., the branch computing system 104 and/or the branch devices 106) associated with the branch location. Upon entering into the wireless communication range, the customer device(s) 108 may be configured to automatically prompt the customer to connect to a session or workspace offered by the branch (e.g., associated with the branch system client application 128 and/or the branch device client application 130), which may increase security by requiring the customer's proximity to the branch. The customer device 108 may then pair with and/or otherwise establish a line of communication with the various devices or systems associated with the branch location (e.g., the provider computing system 102, the branch computing system 104, and/or the branch devices 106). For example, in some instances, the customer device 108 may be able to connect directly to a printer within a branch location to print out various necessary documents based on the authenticated session. In some instances, the customer's access to the branch may be one-time (e.g., once the customer leaves the branch, the customer's personal device unpairs from any associated systems and/or devices) or may be allowed remotely (e.g., through a generic contact added to the customer's personal device that enables remote connection).

In some instances, a first customer device 108 that is paired with or authenticated by the branch computing system 104, the branch devices 106, and/or the provider computing system 102 may extend that authentication and/or pairing to a second customer device 108. For example, in some instances, the authentication and/or pairing may be extended to the second customer device 108 based on proximity of the two customer devices (e.g., geofencing), a close-proximity network connection (e.g., Bluetooth) between the customer devices, and/or a one-time passcode being sent to the first customer device 108 and shared with the second customer device 108. In some instances, the authentication required may differ depending on the action requested by the customer.

In some other instances, an interaction trigger event may comprise the customer logging into the customer client application 132 on one of the customer devices 108. In some instances, the customer may be automatically prompted for authentication information upon logging in. Accordingly, the customer (e.g., via any of the customer devices 108) may provide a password, a passcode, a Personal Identification Number (PIN), a customer device identifier associated with the customer device, or any other suitable authentication information. Upon authentication, the customer may be directed into a secure session or workspace within the customer client application 132. In yet some other instances, an interaction trigger event may comprise the customer scheduling an appointment at a branch location associated with the branch computing system 104 and/or any of the branch devices 106.

Accordingly, the interaction trigger event may happen at any time before or upon initiation of a customer interaction. That is, the systems and methods described herein allow for a customer to either pre-stage, schedule, or plan a customer interaction by requesting an action ahead of time or request an action upon arriving at a branch location using one of the customer devices 108 associated with the customer.

Once the interaction trigger event happens, at step 202, a list of requestable actions may be sent to the customer, at step 204. In some instances, the provider computing system 102 (e.g., via the provider client application 120), the branch computing system 104 (e.g., via the branch system client application 128), and/or any of the branch devices 106 (e.g., via the branch device client application 130) may be configured to send or transmit the list of requestable actions. For example, when the interaction trigger event occurs, the provider computing system 102, the branch computing system 104, and/or the branch device 106 may be configured to automatically push the list of requestable actions to at least one of the customer devices 108.

The various requestable actions may comprise a variety of different financial tasks. For example, the requestable actions may include opening a new financial account (e.g., a checking account, a savings account, a financial trust account, a loan account, a home mortgage account), applying for a new line of credit, applying for a credit limit increase, modifying an existing financial account (e.g., adding/removing authorized users, providing consent for an account modification, change of address, change of legal name, changing daily spending limits), closing a financial account, or any other requestable actions the customer may want to have done. It will be appreciated that the systems and methods described herein may be readily adapted to handle a variety of requestable actions. The aforementioned list is provided as an example and is in no way meant to be limiting.

In some instances, the list of requestable actions provided by the provider computing system 102, the branch computing system 104, and/or any of the branch devices 106 may be based on the capabilities of a particular branch location or a plurality of branch locations located near the customer. For example, if the interaction trigger event is the customer entering into the wireless communication range of the branch computing system 104 and/or the branch devices 106, the list of requestable actions may be provided based on the capabilities of the particular branch location associated with the branch computing system 104 and/or the branch devices 106. In some instances, the list of requestable actions may be determined based on the capabilities of a plurality of local branch locations within a predetermined distance (e.g., five miles, ten miles, fifty miles) from the location of an active customer device 108, which may be determined using geographical location information obtained from the customer device 108.

Once the list of requestable actions has been provided to the customer, at step 204, a requested action (or multiple requested actions) may be received from the customer, at step 206. For example, the provider computing system 102 (e.g., via the provider client application 120), the branch computing system 104 (e.g., via the branch system client application 128) and/or any of the branch devices 106 (e.g., via the branch device client application 130) may receive the requested action from any of the customer devices 108 (e.g., provided by the customer via the customer client application 132).

After the customer has provided the requested action, at step 206, the necessary tasks for completing the requested action are identified, at step 208. For example, in some instances, the provider computing system 102 (e.g., the provider client application 120) may receive the requested action from the customer device 108. The provider client application 120 may then communicate with the procedural determination circuit 122 to determine various procedural information pertaining to the requested action. For example, in some instances, the procedural determination circuit 122 may match the requested action to one of a plurality of potentially requestable actions stored within the procedural database 142.

Based on the corresponding identified requestable action, the procedural determination circuit 122 may obtain and provide the associated procedural information pertaining to the requested action to the provider client application 120. As alluded to above, the procedural information may include an action category or field (e.g., personal, home mortgage, credit application) for the requested action, a list of necessary tasks required and/or recommended for a given requested action, task details associated with the list of necessary tasks, an indication of who is responsible for completing each of the necessary tasks, any task requirements associated with each of the necessary tasks, and any indications and/or explanations of the pertinent portions of any documents, forms, and/or requested information pertaining to the necessary tasks. Accordingly, among other things, the provider client application 120 may use the procedural information to populate and/or update the interaction board (e.g., interaction board 300 shown in FIG. 3) with associated tasks to be completed by the various parties.

The necessary tasks required and/or recommended may include documents, forms, and/or requested information that may be necessary and/or recommended for the customer (or in some cases multiple customers), branch employee, branch manager, and/or the provider employee(s) to provide, fill out, notarize, sign, and/or view for completion of the requested action. In some instances, the customer may further elect (e.g., via the customer client application 132) whether or not they would like to receive advertisements for various services related to the customer's requested action. Accordingly, if the customer indicates that they would like to receive related advertisements, the necessary tasks may further include viewing various recommended advertisements for related services. In some instances, the provider client application 120 may identify various recommended advertisements based on the action category or field associated with the customer's requested action. For example, if the customer has requested to apply for a home mortgage, the provider client application 120 may determine that a necessary task for the customer may be to view or access an advertisement for homeowner's insurance.

The various task requirements may include user authentication, employee oversight, branch manager oversight, heightened branch security, notary signature, or any other pertinent task requirements. For example, the necessary tasks may include obtaining and providing various forms to the customer, creating a new account for the customer, manually entering information provided by the customer, providing or obtaining a copy of the customer's utility bill to verify the customer's address, verifying the customer's income level, providing customer approval of various financial terms, providing a customer personal identification number (PIN), providing a customer signature, obtaining a witness signature, or any other necessary task associated with performing the requested action. Again, it should be appreciated that the aforementioned list of necessary tasks is provided as an example and is in no way meant to be limiting. It should be understood that necessary tasks identified will correspond to a given requested action and may thus be updated or adapted accordingly.

Further, the systems and methods herein can be adapted for requested actions requiring customer authentication, requested actions not requiring customer authentication, requests actions the customer can do on their own, and requested actions where the customer needs assistance from a branch employee, branch manager, and/or a provider employee.

In some instances, various requested actions may require or have it be recommended that the customer is within or sufficiently proximate a branch location. For example, if the requested action is a modification to a will, the customer may be required or recommended to be physically present at a branch location to have a witness for the signing of the will. Similarly, if various documents associated with the requested action require notarization, it may be recommended that the customer be physically present at the branch location, which may have a notary available for completion of the required notarization.

In some instances, the task requirements may further include an indication of required or recommended task completion timing. For example, various tasks may be designated as pre-tasks, customer interaction tasks, and post-tasks or follow-up tasks. The pre-tasks may be tasks that must or are recommended to be completed prior to the customer interaction. The pre-tasks may be associated with tasks that may be performed ahead of time to reduce the time it takes to complete the requested action during the customer interaction. The customer interaction tasks may be tasks that must or are recommended to be completed during the customer interaction. For example, if the tasks is a will signing needs a witness, it may be recommended that the task be performed during the customer interaction. The post-tasks or follow-up tasks may be tasks that must or are recommended to be performed after the customer interaction. In some instances, there may be various tasks associated with completing the requested action that must be performed after the customer interaction. For example, some requested actions may have associated finalization processes (e.g., finalizing the closing of an account, finalizing the creation of a new trust account) that may take additional time to complete, and thus must be completed after the customer interaction.

Once the necessary tasks for completing the requested action have been identified, at step 208, appropriate tasks prompts may then be generated, at step 210. For example, in some instances, the provider client application 120 (e.g., via the procedural determination circuit 122) is configured to generate appropriate task prompts requesting action by the customer, branch employees, branch manager, and/or provider employees, as necessary to complete the requested action. The appropriate task prompts may be provider task prompts, branch task prompts, and/or customer task prompts. The appropriate task prompts may further include the various documents, forms, requested information, and/or the recommended advertisements associated with the corresponding tasks.

Regarding the customer task prompts, once the procedural information has been provided to the provider client application 120, the provider client application 120 may then communicate with the contextual determination circuit 126 to determine various contextual information pertaining to the customer. Then, based on the contextual information, the list of necessary tasks identified, and the task requirements associated with each of the necessary tasks, the provider client application 120 is configured to communicate with the procedural determination circuit 122 to generate appropriate customer task prompts.

That is, the provider client application 120 is configured to determine the most convenient format and customer device 108 to send the customer task prompts to based on the contextual information (e.g., what devices the customer is using, what the capabilities of those devices are) and the task requirements associated with each of the requested tasks (e.g., the kind of documents, forms, and information are being requested). For example, in situations where the requested action is a quick transaction, (e.g., a cash deposit, a cash withdrawal) or a necessary task is verifying general information or making a quick selection (e.g., selecting whether to receive a short advertisement pertaining to a related service), the provider client application 120 may determine that a rich customer device interface is unnecessary. Accordingly, these types of customer prompts may be provided to appropriate customer devices 108 in the form of audio/voice communications. Furthermore, while a variety of customer devices 108 may be appropriate, these types of information may also be easily input by a customer on a customer device 108 having a small touch screen (e.g., a smart watch). As an illustrative example, the provider client application might provide a pop-up or audio notification asking whether the customer still lives at their most recent address. The pop-up or audio notification may allow the customer to simply say or press a button to indicate "yes" or "no."

Conversely, in situations where the requested action requires more information and/or a more detailed response (e.g., opening a new account, a new line of credit, a new personal loan), the provider client application 120 may determine that a rich customer device interface is necessary or recommended. Accordingly, these types of customer prompts may be provided to a customer device 108 having a larger touch screen and/or a keyboard/mouse input (e.g., a larger tablet, a laptop, a desktop computer). In some instances, a first prompt may be sent to a first approved customer device 108 that is active requesting that the customer access a second approved customer device 108 that is inactive to view a second prompt, where the first customer device 108 has lower device capabilities (e.g., smaller screen, no screen, less efficient input entry capabilities) than the second customer device 108.

In some instances, if the provider client application 120 receives an indication that various customer signatures are needed to complete the requested action (e.g., via the procedural determination circuit 122 and the document analyzation circuit 124), the provider client application 120 may send or transmit the associated customer tasks prompts to active customer devices 108 that may allow for the customer to provide an e-signature (e.g., a smart phone, a tablet, a laptop or desktop computer).

In some instances, various requested actions (and their corresponding necessary tasks) may require the customer to be authenticated before they may provide a signature, give consent or approval, elect a delegate, etc. Accordingly, if the provider client application 120 receives an indication that the requested action requires user authentication (e.g., via the procedural determination circuit 122), the provider client application 120 may send or transmit associated customer task prompts to active customer devices 108 that may allow for the customer to provide various authentication information. Accordingly, if a PIN or password is needed to authenticate the customer, the provider client application 120 may send or transmit the associated customer task prompt to active customer devices 108 configured to allow for the PIN or password to be quickly entered (e.g., a smart watch, a smart phone). If a voice sample is required to authenticate the customer using voice recognition, the provider client application 120 may send or transmit the associated customer task prompts to active customer devices 108 configured to allow for a voice sample to be recorded and provided to the provider client application 120 (e.g., a smart phone, a voice assistant device, a smart vehicle voice/touch command system). If a retinal scan is required to authenticate the customer, the provider client application 120 may send or transmit the associated customer task prompts to active customer devices 108 configured to perform a retinal scan (e.g., AR/VR glasses, a smart phone). If a fingerprint scan is required to authenticate the customer, the provider client application 120 may send or transmit the associated customer task prompts to active customer devices 108 configured to perform a fingerprint scan (e.g., a smart phone).

As another illustrative example, if the contextual determination circuit 126 determines that the customer is currently driving (e.g., an active customer device 108 is a smart vehicle voice/touch command system), the provider client application 120 may provide various customer tasks prompts to the customer device 108 (e.g., via the customer client application 132) in the form of audio/voice communications (e.g., via an automated chat bot) to be provided via the smart vehicle voice/touch command system. For example, the provider client application 120 may initiate an automated conversation with the customer and request that the customer vocally or via some other interaction with an input/output device (e.g., the input/output circuit 140) provide various information that is readily available to the customer while driving.

For example, the provider client application 120 may first ask the customer whether they would like to provide information to make their scheduled customer interaction go faster. Upon receiving an affirmative response from the customer, the provider client application 120 may ask a variety of questions aimed at obtaining necessary information pertaining to the customer's requested action. For example, the provider client application 120 may ask the customer questions like "what's the name of the person you want to add to the account," "how old are they," and "what's their birthday." It will be understood that these questions are provided as examples and may be tailored based on the specific customer task prompts provided to the customer.

The provider client application 120 may then be configured to store the customer's responses and apply the information to begin pre-filling a variety of documents and forms associated with the requested action, as appropriate, ahead of a scheduled customer interaction. Accordingly, the customer interaction system 100 may be configured to accumulate various provided information over time ahead of a customer interaction and apply the accumulated information to a variety of documents, forms, and/or the interaction board. As such, various documents and/or forms may be partially or completely pre-filled in advance of a scheduled customer interaction, thereby reducing the time required for customer interaction and ensuring that the customer interaction may be performed efficiently.

In some instances, the contextual determination circuit 126 may be further configured to determine various situational context pertaining to the customer's surroundings. For example, if the contextual determination circuit 126 determines that the customer is driving, the contextual determination circuit 126 may further be configured to determine whether customer is alone within the vehicle. If the contextual determination circuit 126 determines that there does not appear to be anyone in the vehicle with the customer, based on the sounds received from the inside of the vehicle and/or signals received from seat weight sensors, seat belts sensors, etc., the contextual determination circuit 126 may inform the provider client application 120 that the customer may be alone and that it may be appropriate to request sensitive information (e.g., customer PIN, social security number, passwords). In these instances, the provider client application 120 may first ask the customer whether they are alone in the vehicle and whether the customer is comfortable sharing sensitive information. On the other hand, if the contextual determination circuit 126 determines that the customer is not alone within the vehicle, the contextual determination circuit 126 may inform the provider client application 120 that the customer is not alone and that it is not appropriate to request sensitive information.

In another example, if one of the necessary tasks for the requested action includes providing a copy of a document or form (e.g., a utility bill, a pay stub) and the contextual determination circuit 126 determines that an active customer device 108 is a mobile phone with camera capabilities, the provider client application 120 may be configured to send a prompt to the customer requesting that they take a picture of the necessary form, and the provider client application 120 may then scan (e.g., using optical character recognition) the document or form and store it, as necessary for the requested action.

In yet another example, if one of the necessary tasks is dropping off a physical document or form at a branch drive-through or drop-off location or transmitting an electronic document or form from a customer device 108 to the branch computing system 104 and/or one of the branch devices 106 via a close-range wireless communication device or system (e.g., a Bluetooth device, a near-field communication (NFC) device) during a customer interaction, the contextual determination circuit 126 may be configured to indicate to the provider client application 120 when the customer device 108 has entered into a close-range wireless communication range. Accordingly, the provider client application 120 may determine that the customer has arrived at a branch location associated with the branch computing system 104 and/or the branch devices 106 and may push a notification providing instructions on how to drop off and/or transmit the physical and/or electronic document or form.

In a further example, in some instances, a given requested action may require that multiple entities associated with the customer requesting the requested action provide various information (e.g., documents, forms, approvals, signatures). For example, if the customer is requesting a change to an account (e.g., opening, closing, and/or modifying the account) associated with multiple customers (e.g., a joint bank account, a trust fund), the procedural determination circuit 122 may determine that there are customer tasks pertaining to multiple customers associated with the requested action. Accordingly, in some cases, each of the multiple customers may have a variety of corresponding approved customer devices (e.g., similar to the customer devices 108), and the provider client application 120 may similarly determine and send appropriate customer task prompts to each of the various customers via their corresponding approved customer devices in the same manners as described above. As such, in some instances, multiple customers associated with a given requested action may be allowed to view, upload documents to, and download documents from the interaction board (e.g., interaction board 300) to complete the requested action.

Once the appropriate task prompts have been generated, at step 210, the task prompts, as well as any associated documents or forms, may then be sent, transmitted, or pushed to the customer, branch employee(s), branch manager, and/or provider employee(s), at step 212. For example, in some instances, the provider client application 120 is configured to transmit the various task prompts to the corresponding customer devices 108, branch devices 106, branch computing system 104, and/or provider computing system 102, as appropriate. Accordingly, upon receipt of the various task prompts, the customer, branch employee(s), branch manager, and/or provider employee(s) can act upon or perform the various tasks associated with each task prompts.

In some instances, before, during, and/or after the appropriate tasks prompts have been determined, generated, and sent or transmitted to the appropriate parties, the customer, branch manager, branch employee(s), and provider employees(s) may communicate back and forth via the interaction board to establish and/or discuss the pertinent portions of the various documents, forms, and/or necessary information associated with the requested action.

For example, as discussed herein, the provider client application 120 may prompt the provider employee(s), the branch manager, and/or the branch employee(s) to provide an initial indication and/or explanation of the pertinent portions. Alternatively or additionally, the document analyzation circuit 124 may be configured to provide the initial indication and/or explanation of the pertinent portions through use of the trained AI models.

In either case, after the initial indication and explanation of the pertinent portions have been provided, throughout the process of completing the requested action, the various parties (e.g., the customer, the branch manager, the branch employee(s), and/or the provider employee(s)) may communicate back and forth to refine and update the identifications and explanations of the pertinent portions of the documents, forms, and/or necessary information. Similarly, new identifications and explanations of the pertinent portions of new documents, forms, and/or necessary information provided throughout the process of completing the requested action may be added by any of the various parties.

As indicated above, the pertinent portions of the various documents, forms, and/or necessary information associated with the requested action may be, for example, important pages, key passages, required signatures, information entry sections, or any other portions of the documents, forms, and/or requested information that are deemed pertinent to completing the corresponding requestable action. For example, in some instances, a party associated with the requested task (e.g., the customer, the branch employee(s), the branch manager, and/or the provider employee(s)) may provide a particular document or form to the provider client application 120 (e.g., the interaction board) and may provide a communication instructing the appropriate recipient that they only need to view certain pages or paragraphs within the document or form, or that certain pages or paragraphs within the document are irrelevant to the requested action.

Similarly, if the customer receives a document or form to fill out, reviews the document or form, and doesn't understand what is important, what needs to be provided, what needs to be signed, etc., the customer may provide a communication requesting that the pertinent portions of the document be indicated and explained. In some instances, the branch manager, branch employee(s), and provider employee(s) may then respond to the customer's communication indicating and explaining the various pertinent portions. In some other instances, the data-trained AI models of the document analyzation circuit 124 may be configured to generate a response to the customer's communication indicating and explaining the various pertinent portions.

Further, the configuration of the customer interaction system 100 allows for the customer, branch employee(s), branch manager, and/or provider employee(s) to perform their various tasks at differing times and to continuously update the interaction board of the provider client application 120 throughout the process of completing their tasks. Because the interaction board is viewable to each of the various parties, at any point throughout the process of completing the requested action, any of the associated parties may be allowed to view what documents, forms, and/or information have already been collected, as well as what tasks still need to be performed.

In some instances, various necessary tasks identified for completion of the requested action may depend on the successful completion of various other tasks. For example, in some instances, a customer may first need to provide salary information (e.g., via a customer device 108) to a branch employee (e.g., an associated branch device 106) before the branch employee can determine whether to approve or deny a home mortgage application. Accordingly, the branch employee may view the interaction board of the provider client application 120, determine that the customer has yet to provide their salary information, and reach out to the customer to remind them. For example, if the customer has indicated that they would like to receive push notifications, the branch employee (e.g., via the branch device 106) may push a reminder notification to the customer device 108.

Further, in some instances, when one party is waiting on another party to complete their task, the provider client application 120 is configured to automatically provide a notification to the waiting party once the task is completed. For example, in the example provided above, when the customer eventually provides their salary information, the appropriate bank employee may receive an automatic notification that the customer has provided their salary information and that they now have all of the information they need to determine whether to approve or deny the home mortgage application.

Similarly, in some instances, the customer may be prompted to bring various identification forms (e.g., social security card, birth certificate) with them to their scheduled customer interaction at a branch location. In some cases, these identification forms may not be readily available to the customer or may take time for the customer to obtain or find. In these instances, the customer may be reminded (e.g., via a push notification) to obtain the necessary identification forms well in advance of the customer interaction (e.g., a few days, a week, two weeks) to allow the customer time to obtain or find them. The customer may then be reminded (e.g., via a push notification) closer to the customer interaction to remember to bring the identification forms to the customer interaction.

After the various task prompts have been sent or transmitted to the customer, branch employee(s), branch manager, and/or provider employee(s), at step 212, the customer interaction system 100 then determines whether any necessary tasks remain to be performed, at step 214. For example, the provider client application 120 may be configured to determine, based on the interaction board, whether any of the necessary tasks associated with the requested action have yet to be performed.

If the customer interaction system 100 (e.g., the provider client application 120) determines that there are various necessary tasks yet to be performed, the method 200 returns to step 208. That is, if it is determined that various necessary tasks have yet to be performed, the remaining tasks may be identified, as described above, at step 208, new appropriate task prompts (e.g., reminders) for each of the identified tasks may then similarly be generated, at step 210, and those task prompts may then be sent or transmitted to the customer, branch employee(s), branch manager, and/or provider employee(s), as necessary, at step 212. Accordingly, steps 208-214 may be performed multiple times until all of the necessary tasks identified for completion of the requested action have been completed. In some instances, the customer interaction system 100 is configured to continuously or periodically (e.g., once an hour, once a day, once a week) check whether any necessary tasks remain to be performed, at step 214.

In some instances, the customer interaction system 100 may further be configured to only generate new task prompts after a predetermined amount have time has passed since the last corresponding task prompt was sent out. For example, in some instances, the customer interaction system 100 may be configured to generate new tasks prompts if the task has been left uncompleted after receiving the latest task prompt for over a day, over three days, over a week, or any other predetermined amount of time. Further, in some instances, the predetermined amount of time may be based on the relative importance of the task. For example, if a first party (e.g., the customer) needs to complete a first task before a second party (e.g., a branch employee) can complete a second task, the predetermined amount of time may be shorter than if the first task had no effect on the second task (e.g., a daily reminder versus a weekly or bi-weekly reminder).

Upon completion of all of the necessary tasks, the customer interaction system 100 (e.g., the provider client application 120) determines that there are no necessary tasks yet to be performed, at step 212, and the requested action may be marked as completed, at step 216.

Figure 3:
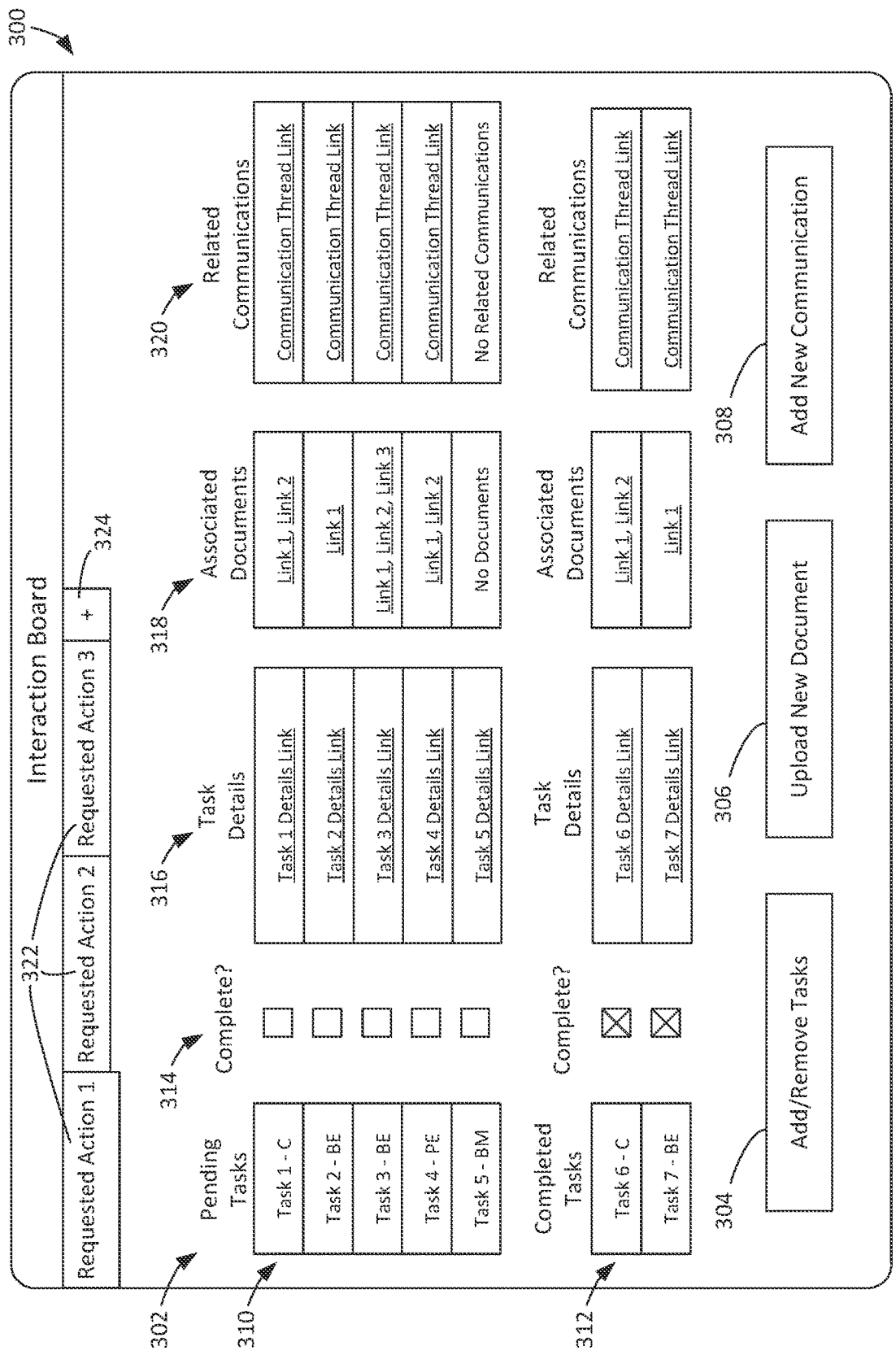
FIG. 3 is a user interface showing an interaction board provided by a provider client application, according to an example embodiment.

Referring now to FIG. 3, a graphical user interface depicting the interaction board 300 provided by the provider client application 120 is shown, according to an example embodiment. As alluded to above, the interaction board 300 shown in FIG. 3 may be accessible and selectively updatable by the customer (e.g., via the customer client application 132 displayed on a customer device 108), the branch employee(s) (e.g., via the branch device client application 130 displayed on a branch device 106), the branch manager (e.g., via the branch system client application 128 displayed on a branch computing system 104), and/or the provider employee(s) (e.g., via provider client application 120 displayed on the provider computing system 102).

The interaction board 300 includes a list of tasks 302, an add/remove tasks button 304, an upload new document button 306, and an add new communication button 308. The list of tasks 302 may be automatically sorted into a pending task area 310 and a completed task area 312 based on each task's completion status. Additionally, each of the various tasks listed in the list of task 302 may include an indication of who is responsible for completing the corresponding task. For example, as shown in FIG. 3, after each listed task there is an indication of who is responsible for completing the task (e.g., C—Customer, BE—Branch Employee, BM—Branch Manager, PE—Provider Employee). It will be appreciated that the various tasks (e.g., Task 1, Task 2, Task 3) shown in FIG. 3 may be any of the various tasks discussed herein. The user may further use the add/remove task buttons 304 to add and/or remove tasks from the list of tasks 302, as necessary. In some instances, only certain users (e.g., branch managers, provider employees) may have authority to add and/or remove tasks from the list of tasks 302.

The list of tasks 302 further includes a corresponding set of task completion boxes 314, a set of corresponding task details 316, a set of associated documents 318, and a set of related communications 320. The task completion boxes 314 may provide a clickable box that allows for the appropriate party (or any other appropriate parties) to indicate whether or not the corresponding task has been completed. The set of corresponding task details 316 may include various task details links configured to direct the user to a detailed task description pertaining to the corresponding task. The task description may include any of the various task details described herein, as well as any other pertinent information pertaining to the corresponding task. In some instances, in lieu of the task details link, the various task details may be provided directly on the interaction board 300 (e.g., via a scrollable text field). In some instances, the various task descriptions may be selectively editable and/or updatable by certain users (e.g., branch employees, branch managers, provider employees). Accordingly, upon request by the customer for additional details for a particular task, the branch employees, branch managers, and/or provider employees may selectively update, modify, or otherwise add to the corresponding task description.

The set of associated documents 318 may similarly include links to the various documents, forms, and/or information collected pertaining to the corresponding task. The various users may further use the upload new document button 306 to selectively upload new documents or forms corresponding to a particular task to the interaction board 300. For example, if the customer was responsible for providing a copy of their utility bill, the customer could scan their utility bill and upload it to the interaction board 300 to be used as appropriate to complete the corresponding requested action. The various documents, forms, and/or information provided may be uploaded to, downloaded from, and/or otherwise retrievably stored within the memory 116 of the provider computing system 102. Further, in some instances, once uploaded to the interaction board 300, the various documents may modified into interactive documents, such that multiple entities may open, view, and/or edit the interactive documents within the interaction board 300 simultaneously from different devices or systems (e.g., the provider computing system 102, the branch computing system 104, the branch devices 106, and/or the customer devices 108).

Accordingly, in some instances, the customer may bring various customer devices 108 (e.g., a mobile phone, a tablet, a smart watch) to use during a customer interaction at a branch location. For example, the interaction board 300 may allow for the customer (e.g., via any of the various customer devices 108) and a branch employee (e.g., via a corresponding branch device 106) to simultaneously view and edit a document that is necessary for the completion of the requested action. The interaction board 300 may further be configured to allow for the customer and/or branch employee to push and/or pull various documents, forms, and/or other necessary information to the interaction board 300 during the customer interaction at the branch location. Thus, the branch employee may go through various relevant document with the customer, explain any pertinent portions of the documents in person, and have the customer provide various information and/or signatures, as necessary, to fill out the document, all using the interaction board 300, which is accessible by the customer client application 132 and the branch device client application 130 during the customer interaction. Accordingly, the customer may be encouraged by the provider to bring in their personal devices to the customer interaction.

The set of related communications 320 may similarly include various communication thread links configured to direct the user to an ongoing open chat conversation (e.g., a message board) between the various parties associated with the corresponding task. In some instances, the open chat conversation may be provided directly on the interaction board 300 (e.g., via a scrollable text field).

In some instances, the interaction board 300 may be configured to allow all parties to view and/or interact with any of the tasks. In some instances, certain parties (e.g., the customer, the branch employee(s), the branch manager, and/or the provider employee(s)) may only be allowed to view and/or interact with the tasks that they are responsible for, as deemed appropriate for a given set of tasks. Accordingly, in some instances, the tasks that the restricted party is not responsible for may be either visible and grayed out (e.g., non-clickable and/or not available for interaction) or removed completely when they view the interaction board 300. For example, in some instances, various tasks pertaining to or requiring the submission of sensitive information may only be visible to the responsible party and any other necessary pre-approved parties.

The interaction board 300 may further include multiple requested action tabs 322. For example, if the customer has multiple requested actions in process at once, each requested action may have its own interaction board (e.g., similar to the interaction board 300). Similarly, if a branch employee, branch manager, or provider employee is working on multiple requested actions from the customer or multiple customers, each requested action may have its own corresponding interaction board. The various requested action tabs 322 may be clickable to allow the user to switch between the various interaction boards pertaining to the various requested actions.

The requested action tabs 322 may further include an add requested action tab 324. Upon clicking the add requested action tab 324, the user may be provided with a list of requestable actions for selection by the user. In some instances, the selection of any of the various requestable actions may serve as a new interaction triggering event, and may thus begin the method 200 described above.

Those of skill in the art will appreciate that FIG. 3 is meant to be illustrative, rather than limiting. For example, in other embodiments, the interface is configured differently, such as including different links, different indication boxes, different notifications, a different order, a different arrangement, or different options generally. As another example, in other embodiments, the interaction board 300 may include a separate field or area for indicating who is responsible for completing each listed task. As another example, in other embodiments, the interaction board 300 may include a document description area configured to provide a quick summary of each of the various uploaded documents pertaining to each listed task. As yet another example, in some instances, the interaction board 300 may include an indication of the timing of the requested action (e.g., pre-task to be performed prior to the customer interaction, task to performed during the customer interaction, and/or post-task to be performed after the customer interaction).

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more dedicated processors communicatively coupled to one or more dedicated memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Additionally or alternatively, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc.

An example system for implementing the overall system or portions of the embodiments might include general-purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed:

1. A method comprising:
  training, by a provider computing system associated with a provider, one or more artificial intelligence (AI) models to generate task prompts, wherein training the one or more AI models comprises:
    training, by the provider computing system, the one or more AI models to generate the task prompts based on historical data comprising a plurality of example prompts created in various example scenarios;
    receiving, by the provider computing system, feedback regarding the generated task prompts, the feedback comprising at least one of (i) at least one of usefulness, convenience, or appropriateness of the task prompts, or (ii) the task prompts being modified to a different format, include more detail, or include less detail; and updating, by the provider computing system, the one or more AI models using the feedback to generate one or more updated AI models;

receiving, by the provider computing system, a requested action from a customer;

determining, by the provider computing system, contextual information about a plurality of customer devices that the customer has indicated for use with the provider computing system;

generating, by the provider computing system using the one or more updated AI models, a task prompt based on an identified customer pre-task for completion of the requested action, the task prompt requesting the customer to perform the customer pre-task based on the contextual information;

generating, by the provider computing system, an interaction board accessible by the customer via a customer device associated with the customer and accessible by an employee associated with the provider via an employee device associated with the employee, the interaction board being displayed via a graphical user interface and including the customer pre-task;

receiving, by the provider computing system, an indication that the customer pre-task has been completed prior to a customer interaction at a branch location, the customer interaction associated with the requested action, the branch location associated with the provider;

updating, by the provider computing system, the interaction board to indicate that the customer pre-task has been completed prior to the customer interaction;

receiving, by the provider computing system, information associated with the requested action from the customer device during the customer interaction; and updating, by the provider computing system, the interaction board to include the information received from the customer device during the customer interaction.

2. The method of claim 1, further comprising:
identifying, by the provider computing system, the customer device from the plurality of customer devices based on the customer pre-task and the contextual information; and
transmitting, by the provider computing system, the task prompt to the customer device.

3. The method of claim 1, further comprising:
receiving, by the provider computing system, biometric data associated with the customer; and
authenticating, by the provider computing system, the customer via the biometric data.

4. The method of claim 1, further comprising:
receiving, by the provider computing system from the customer device via a near-field communication (NFC) device or a radio-frequency identification (RFID) device, a unique device identifier; and
authenticating, by the provider computing system, the customer via the unique device identifier.

5. The method of claim 2, wherein the task prompt is a request for the customer to complete and provide at least one of a document or a form associated with the requested action, and the information received from the customer during the customer interaction is at least one of another document or another form associated with the requested action.

6. The method of claim 1, further comprising:
uploading a document to the interaction board by at least one of the customer via the customer device or the employee via the employee device.

7. The method of claim 6, wherein, once uploaded to the interaction board, the document is viewable and/or editable by the customer device and the employee device.

8. The method of claim 6, further comprising:
receiving task details pertaining to the customer pre-task from at least one of the employee device or a document analysis circuit, the task details including an indication of pertinent portions of the document; and
updating, by the provider computing system, the interaction board to include the task details.

9. The method of claim 8, wherein receiving the task details comprises receiving the task details from the document analysis circuit, and the method further comprises:
identifying, by the document analysis circuit, the pertinent portions of the document using artificial intelligence models trained by studying at least one of user inputs over time relating to similar documents or historical data relating to similar documents.

10. The method of claim 1, further comprising:
determining, by the provider computing system, whether the customer is driving; and
providing, in response to determining that the customer is driving and by the provider computing system, the customer pre-task to the customer via voice communications.

11. The method of claim 1, further comprising:
identifying, by the provider computing system, a provider task for completion of the requested action to be performed by the employee;
updating, by the provider computing system, the interaction board to include the provider task;
generating, by the provider computing system, a provider task prompt requesting the employee to perform the provider task;
transmitting, by the provider computing system, the provider task prompt to the employee device;
receiving, by the provider computing system, a provider indication from the employee device that the provider task has been completed; and
updating, by the provider computing system, the interaction board to indicate that the provider task has been completed.

12. A method comprising:
training, by a provider computing system associated with a provider, one or more artificial intelligence (AI) models to generate task prompts, wherein training the one or more AI models comprises:
training, by the provider computing system, the one or more AI models to generate the task prompts based on historical data comprising a plurality of example prompts created in various example scenarios;
receiving, by the provider computing system, feedback regarding the generated task prompts, the feedback comprising at least one of (i) at least one of usefulness, convenience, or appropriateness of the task prompts, or (ii) the task prompts being modified to a different format, include more detail, or include less detail; and
updating, by the provider computing system, the one or more AI models using the feedback to generate one or more updated AI models;
receiving, by the provider computing system, a requested action from a customer;
identifying, by the provider computing system, a customer pre-task for completion of the requested action to be performed by the customer;

determining, by the provider computing system, contextual information about a plurality of customer devices associated with the customer;

identifying, by the provider computing system, a customer device of the plurality of customer devices based on the customer pre-task and the contextual information;

generating, by the provider computing system using the one or more updated AI models, a task prompt requesting the customer to perform the customer pre-task based on the contextual information; and transmitting, by the provider computing system, the task prompt to the customer device.

13. The method of claim 12, wherein the contextual information includes at least one of a device form, a set of device capabilities, a device status, or device location information of the customer device.

14. The method of claim 12, wherein the task prompt is a request for at least one of a document, a form, or information from the customer.

15. The method of claim 12, further comprising:

identifying, by the provider computing system, a provider task for completion of the requested action to be performed by an employee associated with the provider associated with the provider computing system;

generating, by the provider computing system, a provider task prompt requesting the employee to perform the provider task; and transmitting, by the provider computing system, the provider task prompt to an employee device associated with the employee.

16. A customer interaction system comprising:

a provider computing system associated with a provider and configured to communicate with a customer device associated with a customer and with an employee device associated with an employee of the provider via a network, the provider computing system comprising a processing circuit including a processor and a memory, the processing circuit structured to:

train one or more artificial intelligence (AI) models to generate task prompts, wherein training the one or more AI models comprises:

training the one or more AI models to generate the task prompts based on historical data comprising a plurality of example prompts created in various example scenarios;

receiving feedback regarding the generated task prompts, the feedback comprising at least one of (i) at least one of usefulness, convenience, or appropriateness of the task prompts, or (ii) the task prompts being modified to a different format, include more detail, or include less detail; and updating the one or more AI models using the feedback to generate one or more updated AI models;

receive a requested action from the customer via the customer device;

identify a customer pre-task for completion of the requested action to be performed by the customer;

determine contextual information about a plurality of customer devices that the customer has indicated for use with the provider computing system;

generate, using the one or more updated AI models, a task prompt requesting the customer to perform the customer pre-task based on the contextual information;

generate an interaction board accessible by the customer via the customer device and the employee via the employee device, the interaction board being displayed via a graphical user interface and including the customer pre-task;

receive an indication that the customer pre-task has been completed prior to a customer interaction at a branch location, the customer interaction associated with the requested action, the branch location associated with the provider;

update the interaction board to indicate that the customer pre-task has been completed prior to the customer interaction;

receive information associated with the requested action from the customer device during the customer interaction; and update the interaction board to include the information received from the customer device during the customer interaction.

17. The customer interaction system of claim 16, wherein the processing circuit is further structured to:

identify the customer device from the plurality of customer devices based on the customer pre-task and the contextual information; and transmit the task prompt to the customer device.

18. The customer interaction system of claim 17, wherein the contextual information includes at least one of a device form, a set of device capabilities, a device status, or device location information of each of the plurality of customer devices.

19. The customer interaction system of claim 16, wherein the provider computing system is structured to pull the contextual information from the plurality of customer devices automatically.

20. The customer interaction system of claim 16, wherein the processing circuit is further structured to:

identify a provider task for completion of the requested action to be performed by the employee;

update the interaction board to include the provider task;

generate a provider task prompt requesting the employee to perform the provider task;

transmit the provider task prompt to the employee device;

receive a provider indication from the employee that the provider task has been completed; and update the interaction board to indicate that the provider task has been completed.

* * * * *